Sept. 9, 1952     C. A. HANSEN, JR     2,610,301
X-RAY PHOTOMETER
Filed March 27, 1951
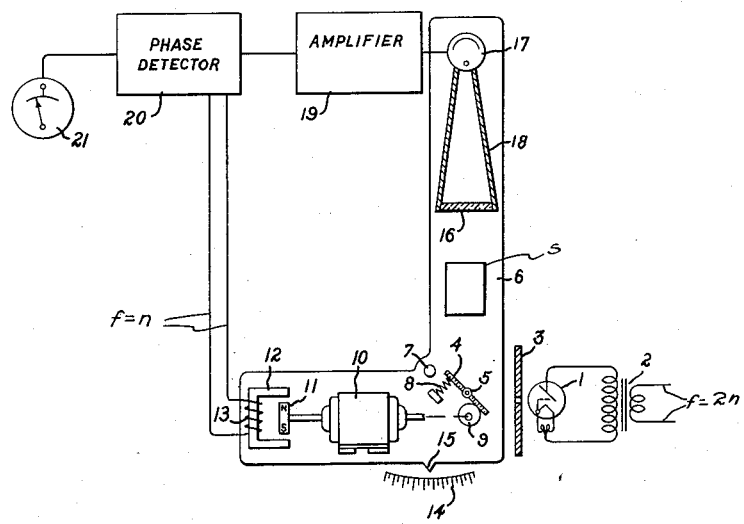
Inventor:
Charles A. Hansen Jr.,
by Paul A. Frank
His Attorney.

Patented Sept. 9, 1952

2,610,301

UNITED STATES PATENT OFFICE 2,610,301

X-RAY PHOTOMETER

Charles A. Hansen, Jr., Scotia, N. Y., assignor to General Electric Company, a corporation of New York Application March 27, 1951, Serial No. 217,850

2 Claims. (Cl. 250—52)

My invention relates to X-ray photometers and more particularly to such photometers suitable for determining the constituents of a material and the relative percentage of each therein.

An object of my invention is to provide a new and improved X-ray photometer suitable for determining the constituents of a material.

Another object of my invention is to provide a new and improved device for indicating the relative amounts of the constituents of a material.

In the attainment of the foregoing objects, I provide an X-ray tube energized by an alternating voltage. The X-ray output of the tube is, therefore, pulses of X-rays occurring at the frequency of the source. These X-ray pulses are collimated and then monochromatized by refraction from a flat or curved crystal. By monochromatized it is meant that by means of the crystal an extremely small portion of the X-ray spectrum is selected for further employment in the photometer. As is known in the art, the angle of incidence between the X-rays and the crystal determines the narrow band of wave lengths refracted from the crystal in a particular direction. Consequently, by slowly changing this angle of incidence, the wave lengths of the X-rays refracted from the crystal in a given direction may be made to sweep through a portion of the spectrum. In this device a sample is placed in a stationary position with respect to the crystal so that the X-rays penetrating it sweep through the desired portion of the spectrum as the crystal is rotated. The absorption of X-rays by a given element of the sample increases in an exponential manner with the wave length of the X-rays except for definite discontinuities where the absorption falls sharply as the wave length is increased a small amount. As the X-ray wave length is further increased, the absorption again rises exponentially until other discontinuities or absorption edges are reached.

As the wave length of X-rays passing through a given element is slowly increased from a wave length shorter than that corresponding to the absorption edge, some of the energy absorbed from the X-rays is used in ejecting the K electrons from the K electron shell of the element. As the wave length reaches the point where its energy is exactly equal to the energy required to eject the K electrons, the absorption of X-rays is at a maximum. This is almost equivalent to a resonant effect. As soon as the wave length of the X-ray quanta rises so that insufficient energy is available to eject the K electrons, the absorption coefficient falls off sharply since no absorption or energy dissipation can then take place by this means. This discontinuity is known as the K absorption edge. As the wave length is still further increased, other discontinuities are found as the energy is just sufficient to eject particular electrons from the L, M and N electron shells. These shells are, however, of little interest in the present invention.

Each element requires a different energy to eject the K electrons, because of the different charge on the nucleus of each element that holds the electrons to their orbit. Since the energy in an X-ray quanta is proportional to its frequency, if the frequency or wave length of the X-rays at an absorption edge are determined, the element is thus identified.

To readily detect and to roughly measure the changes in the attenuation of the sample at any K-band, I provide a wobble motor to vibrate the crystal about an axis perpendicular to the X-ray column. This vibration causes the wave length of the monochromatized X-ray column to vary over a very small portion of the spectrum. The speed of rotation of the motor is so chosen that for each pulse of X-rays from the X-ray tube the crystal is at a point of maximum excursion from its mean position. Therefore, as the mean position of the crystal is gradually moved, the pulses of X-rays penetrating the sample alternately have wave lengths on opposite sides of the mean wave length. When the mean wave length is at the K-band of a constituent of the material, the lower wave length pulse is much more greatly attenuated than is the higher wave length pulse. To indicate this difference in attenuation of succeeding pulses around any mean angle and to give a measure of the magnitude of it, there is provided a fluorescent screen which transforms the X-rays passing through the sample into light rays. A phototube transforms this light energy into electric energy and supplies it to a balanced amplifier circuit synchronized by pulses from the wobble motor. This circuit provides an output current which has a magnitude dependent upon the difference between the amplitudes of succeeding pulses from the phototube. The current may be indicated by a conventional meter and a sudden increase therein is indicative of the presence of a K-band at a wave length corresponding to the angle of incidence between the X-rays and the crystal.

For a better and more complete understanding of my invention, together with additional objects and advantages thereof, reference should now be had to the following description, together with the accompanying drawing, which is a schematic diagram of an X-ray photometer constructed according to this invention.

Referring to the drawing an X-ray tube 1 is energized from a source of alternating voltage through a transformer 2. A collimator 3, which is generally formed of lead, is placed between tube 1 and a monochromatizing, flat crystal 4. Consequently, the X-rays striking crystal 4 are essentially parallel. Crystal 4 is pivotally mounted about an axis 5 which is perpendicular to the column of X-rays from tube 1. A support member 6 is free to be rotated about a pivot 7 and a resilient member 8 is fastened at one end to support 6 and at the other end to crystal 4.

An eccentric 9 is rotated by the shaft of a synchronous electric motor 10 which is supplied from a source having the same frequency as the source supplying X-ray tube 1 and is preferably supplied from the same source.

A bar magnet 11 is mounted adjustably on the shaft of motor 10 and normal thereto. The mounting of magnet 11 is adjustable so that the angular position of magnet 11 relative to the rotor of motor 10 may be varied. A C-shaped ferro-magnetic core 12, having a coil 13 wound thereon, is located with respect to magnet 11 such that an alternating current is induced in coil 13. This current has a frequency equal to the frequency of rotation of the shaft of motor 10.

A scale 14 is positioned opposite an indicator 15 on support 6 to indicate the relative position of support 6 and the parts mounted thereon with respect to collimator 3. A fluorescent screen 16 is mounted on support 6 to intercept the monochromatic X-rays refracted from crystal 4. Screen 16 transforms the X-ray energy incident thereon to lower energy light rays which determine the current output of a phototube type of transducer 17. A cone-shaped light collector 18 increases the efficiency of the system, as is well known in the art. The output of phototube 17 is supplied to amplifier 19 and then to a phase detector 20. Phase detector 20 is also supplied with a synchronizing signal from coil 13. In the phase detector the signals from phototube 17 are combined with the synchronizing signals from coil 13 to produce an output signal which is indicative of the difference in magnitude of succeeding X-ray pulses.

A suitable phase detector circuit for use in this invention is illustrated and described in the article entitled "X-Ray Photometer" by P. C. Michel and T. A. Rich appearing in the February 1947 issue of "General Electric Review." Fig. 5 of the article illustrates the circuit, entitled "'amplifier' and phase detector circuit." In the description, the "amplifier" and phase detector portions thereof are treated separately. The term "phase detector 20" as employed herein, however, includes both portions. A conventional ammeter 21 is connected to be supplied with the output of phase detector 20. Although an ammeter has been shown, it will be understood that any other visual indicator of current may be employed or perhaps the output of the phase detector may be used to energize a control circuit.

In operation, a schematically represented sample S to be tested is placed between crystal 4 and fluorescent screen 16 and motor 10 is connected to rotate at a frequency half of that of the voltage supplied to X-ray tube 1. Eccentric 9 thus causes crystal 4 to vibrate about a mean position at half the frequency of the X-ray pulses incident thereto. A synchronizing signal having the same frequency as that of motor 10 is supplied from the coil 13 of the magnet assembly to the phase detector. This pick-up signal is used rather than a signal direct from the line to allow adjustment for phase differences by shifting the magnet 11 on the motor shaft. Support 6 is slowly rotated about pivot 7 and the angle of incidence between the X-ray column and the mean position of crystal 4 is indicated on dial 14. When the wave length of the monochromatized X-rays penetrating the sample reaches a K-band, succeeding X-ray pulses impinging on screen 16 have greatly differing magnitudes, which is indicated by meter 21. At this time, the position of pointer 15 on dial 14 gives an indication of the monochromatized wave length refracted by crystal 4 and, hence, of the particular element present in the sample. The magnitude of the current change in meter 21 is indicative of the relative amount of the particular element in the sample.

In some cases, the magnitude of the K absorption edge is affected by the presence of other elements, which, of course, means the magnitude of meter signal is affected. However, the positive change in output, which indicates the element, will be present under any circumstances, and quantitative analysis may be had with almost any sample by the use of empirical means.

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. An X-ray photometer comprising a source of pulsed collimated X-rays, monochromatizing means positioned to intercept said X-rays including a crystal pivotally mounted on an axis perpendicular to the longitudinal axis of the column of X-rays, said crystal being mounted such that the average angular position thereof may be gradually varied; a motor for oscillating said crystal a determinable amount about said pivotal axis; means indicating the mean angular position of said crystal; a fluorescent screen positioned to intercept the column of X-rays refracted by said crystal; transducing means positioned to be energized by light from said screen and to transform the energy of said light into electric energy, and electric means connected to indicate the difference in the magnitudes of the output of said transducing means at the opposite maximum excursions of said crystal through any mean angle.

2. An X-ray photometer comprising a discharge device radiating X-rays, a source of alternating voltage connected to supply energy to said device; a collimator located in spaced relationship with said device to collimate a portion of the X-ray energy radiated therefrom; a monochromatizing crystal positioned on a rotatable support to monochromatize the column of X-rays, said crystal being pivotally mounted on an axis perpendicular to the longitudinal axis of said column of X-rays; a wobble motor connected to vibrate said crystal about the pivot axis, the frequency of vibration being half the frequency of said source of alternating voltage; means indicating the mean angular position of said crystal; a fluorescent screen positioned to intercept the column of monochromatized X-rays refracted by said crystal; transducing means positioned to be energized by light from said screen and to transform the energy of said light into electric energy; and electric means connected to be supplied with the output of said transducer and a synchronizing signal controlled by said motor to indicate the difference in the magnitudes of the output of said transducing means at the opposite maximum excursions of said crystal through any mean angle.

CHARLES A. HANSEN, Jr.

REFERENCES CITED

The following references are of record in the file of this patent:

UNITED STATES PATENTS

| Number | Name | Date |
|---|---|---|
| 2,452,045 | Friedman | Oct. 26, 1948 |
| 2,469,206 | Rich | May 3, 1949 |
| 2,474,835 | Friedman | July 5, 1949 |
| 2,539,196 | Marshall | Jan. 3, 1951 |

OTHER REFERENCES

X-Ray Photometer by T. C. Michel et al., G. E. Review, pp. 45–48, Feb. 1947.